United States Patent
Majewski et al.

(10) Patent No.: US 8,145,064 B2
(45) Date of Patent: Mar. 27, 2012

(54) SYSTEM AND METHOD FOR SUPPRESSING NOISE BY FREQUENCY DITHER

(75) Inventors: Alexander J. Majewski, Fairfield, CT (US); Rene Abreu, The Villages, FL (US)

(73) Assignee: Goodrich Corporation, Charlotte, NC (US)

( * ) Notice: Subject to any disclaimer, the term of this patent is extended or adjusted under 35 U.S.C. 154(b) by 839 days.

(21) Appl. No.: 12/234,162

(22) Filed: Sep. 19, 2008

(65) Prior Publication Data

US 2010/0074363 A1 Mar. 25, 2010

(51) Int. Cl.
*H04B 10/00* (2006.01)
(52) U.S. Cl. ........................................... 398/158
(58) Field of Classification Search ........... 398/140–172
See application file for complete search history.

(56) References Cited

U.S. PATENT DOCUMENTS

| | | | |
|---|---|---|---|
| 5,265,039 A | 11/1993 | Curbelo et al. | |
| 5,267,019 A * | 11/1993 | Whittaker et al. | 356/437 |
| 5,883,518 A | 3/1999 | Borden | |
| 5,966,019 A * | 10/1999 | Borden | 324/754.22 |
| 6,259,712 B1 * | 7/2001 | DeCain et al. | 372/32 |
| 6,348,683 B1 * | 2/2002 | Verghese et al. | 250/214.1 |
| 6,377,350 B1 * | 4/2002 | Paldus et al. | 356/454 |
| 6,500,618 B1 | 12/2002 | Woolard et al. | |
| 6,658,034 B2 * | 12/2003 | Garnache et al. | 372/45.013 |
| 6,806,967 B2 * | 10/2004 | Atia et al. | 356/519 |
| 7,174,037 B2 * | 2/2007 | Arnone et al. | 382/128 |
| 7,177,781 B2 * | 2/2007 | Strang et al. | 702/183 |
| 7,214,289 B2 * | 5/2007 | Strang et al. | 156/345.28 |
| 7,271,594 B2 | 9/2007 | Abreu et al. | |
| 7,291,839 B1 * | 11/2007 | Demers et al. | 250/341.1 |
| 7,332,234 B2 * | 2/2008 | Levinson et al. | 398/135 |
| 7,538,881 B2 * | 5/2009 | Ye et al. | 356/454 |
| 8,009,296 B2 * | 8/2011 | Sanders et al. | 356/461 |
| 8,027,590 B2 * | 9/2011 | Majewski et al. | 398/135 |
| 2002/0067480 A1 * | 6/2002 | Takahashi | 356/317 |
| 2004/0114939 A1 | 6/2004 | Taylor | |

(Continued)

FOREIGN PATENT DOCUMENTS

WO WO 03/005510 A1 1/2003

(Continued)

OTHER PUBLICATIONS

S. Verghese, et al.; *Generation and Detection of Coherent Terahertz Waves Using Two Photomixers*; American Institute of Physics—Applied Physics Letters, vol. 73, No. 26, Dec. 1998.

(Continued)

*Primary Examiner* — Agustin Bello
(74) *Attorney, Agent, or Firm* — Smith Moore Leatherwood LLP

(57) ABSTRACT

A system for suppressing noise by frequency dither includes a transmitter, receiver and a frequency dither circuit, as well as a cavity along a propagation path of the electromagnetic signal between the transmitter and the receiver. The transmitter is configured to transmit an electromagnetic signal to the receiver at each of one or more selectable frequencies. The frequency dither circuit is configured to apply a frequency dither to the electromagnetic signal transmitted from the transmitter to the receiver at each of the selectable frequencies. In this regard, the applied frequency dither has a span having been selected as a function of a minimum frequency period of an expected standing wave in the system, and a rate having been selected as a function of a signal processing bandwidth for sampling a frequency spectrum including the selectable frequencies.

20 Claims, 9 Drawing Sheets

U.S. PATENT DOCUMENTS

2004/0188600 A1* 9/2004 Chapman ............... 250/227.23
2008/0074660 A1* 3/2008 Ye et al. ...................... 356/300

FOREIGN PATENT DOCUMENTS

WO   WO 2004/083796 A1   9/2004
WO   WO 2007/004168 A1   1/2007

OTHER PUBLICATIONS

EP Search Report dated Dec. 13, 2011 for EP Appl. No. 09011486.9.

J. Reid et al., Sensitivity limits of a tunable diode laser spectrometer, with application to the detection of NO2 at the 100-ppt level, Applied Optics, Oct. 1, 1980, pp. 3349-3354, vol. 19, No. 19, Optical Society of America.

Ian S. Gregory et al., Continuous-Wave Terahertz Photomixer Systems for Real-World Applications, Miles et al.: Terahertz frequency detection and identification of materials and objects, Dec. 13, 2007, pp. 167-184, Springer.

* cited by examiner

SYSTEM AND METHOD FOR SUPPRESSING NOISE BY FREQUENCY DITHER

FIELD OF THE INVENTION

Exemplary embodiments of present invention generally relate to systems and methods of propagating electromagnetic signals and, more particularly, systems and methods of suppressing noise in propagating electromagnetic signals by frequency dither.

BACKGROUND OF THE INVENTION

Spectrometry using continuous wave (CW) tunable sources with narrow spectral linewidth and long coherence lengths has well-known advantages associated with high spectral contrast, frequency selectivity and excellent sensitivity. Scanning CW terahertz (THz) spectrometers are a prime example of this technology. A negative consequence of long coherence lengths, however, may be the transmission modulation resulting from reflections from spurious resonant cavities. A significant and often dominant noise source may be the random amplitude variation resulting from source frequency random jitter and repeatability error coupled with the standing wave transmission modulation (intensity gradients) of these spurious cavities.

Spurious cavities may be formed by Fresnel reflections from any surfaces between the transmitter and receiver electromagnetic wave propagation path. The reflectivity of these surfaces may be difficult to suppress because of the wide frequency range covered in the THz spectrometer making anti-reflective (AR) coatings ineffective. It would therefore be desirable to design an apparatus and method of effectively suppressing noise due to random amplitude variations from spurious cavities.

SUMMARY OF THE INVENTION

In light of the foregoing background, embodiments of the present invention provide an improved system and method of suppressing noise by frequency dither. According to one aspect of the present invention, the system includes a transmitter, receiver (e.g., photomixer transmitter and receiver of a spectrometer system) and a frequency dither circuit. Additionally, the system may include a cavity (spurious cavity) along a propagation path of the electromagnetic signal between the transmitter and the receiver. The transmitter is configured to transmit an electromagnetic signal to the receiver at each of one or more selectable frequencies. The frequency dither circuit is configured to apply a frequency dither to the electromagnetic signal transmitted from the transmitter to the receiver at each of the selectable frequencies. In this regard, the applied frequency dither has a span having been selected as a function of a minimum frequency period of an expected standing wave in the system, and a rate having been selected as a function of a signal processing bandwidth for sampling a frequency spectrum including the selectable frequencies. The receiver, then, may be configured to average the electromagnetic signal at the dither frequency received thereat.

More particularly, for example, the frequency dither circuit may be configured to apply the frequency dither with a span having been selected as at least the minimum frequency period. In such instances, the minimum frequency period may have been determined as a function of a free spectral range of the cavity, or from measurement of a transmission function of the system. Further, for example, the span may have been selected also based upon a modulation depth of the expected standing wave.

The system may further include a transmitter bias modulator configured to generate a modulated signal for biasing the transmitted electromagnetic signal. In such instances, the signal processing bandwidth may have been determined based upon the modulated signal, such as that required to process the modulated signal with minimal attenuation. The frequency dither circuit, then, may be configured to apply the frequency dither with a rate having been selected as greater than the signal processing bandwidth.

The system may include a first propagation path of the electromagnetic signal to the transmitter, and a second propagation path of the other electromagnetic signal to the receiver. In this regard, the system may further include an arrangement located along either of first or second propagation paths of signals to the transmitter or receiver, respectively, or along each of the first and second propagation paths, for altering the length of respective propagation path(s).

The pre-selected rate may comprise a rate selected as a function of the frequency at which the electromagnetic signal is transmitted. More particularly, the pre-selected rate may comprise a rate selected to span one or more periods of the electromagnetic signal transmitted at a respective frequency over a dwell time. In one instance, for example, the pre-selected rate may comprise a rate $\omega_{FS}$ selected to effectuate a path length modulation at a frequency:

$$\omega_{FS} = \frac{2\pi}{\lambda} n_F S_F$$

In the preceding, $\lambda$ (e.g., $\lambda_{THz}$) represents the wavelength of the electromagnetic signal at a respective frequency, $n_F$ represents the index of refraction of a propagating medium of the propagation paths, and $S_F$ represents the pre-selected rate.

According to other aspects of the present invention, a method of suppressing noise by frequency dither is provided. Exemplary embodiments of the present invention therefore provide an improved system and method of suppressing noise by frequency dither. As indicated above, and explained below, exemplary embodiments of the present invention may solve problems identified by prior techniques and provide additional advantages.

BRIEF DESCRIPTION OF THE DRAWINGS

Figure 1:
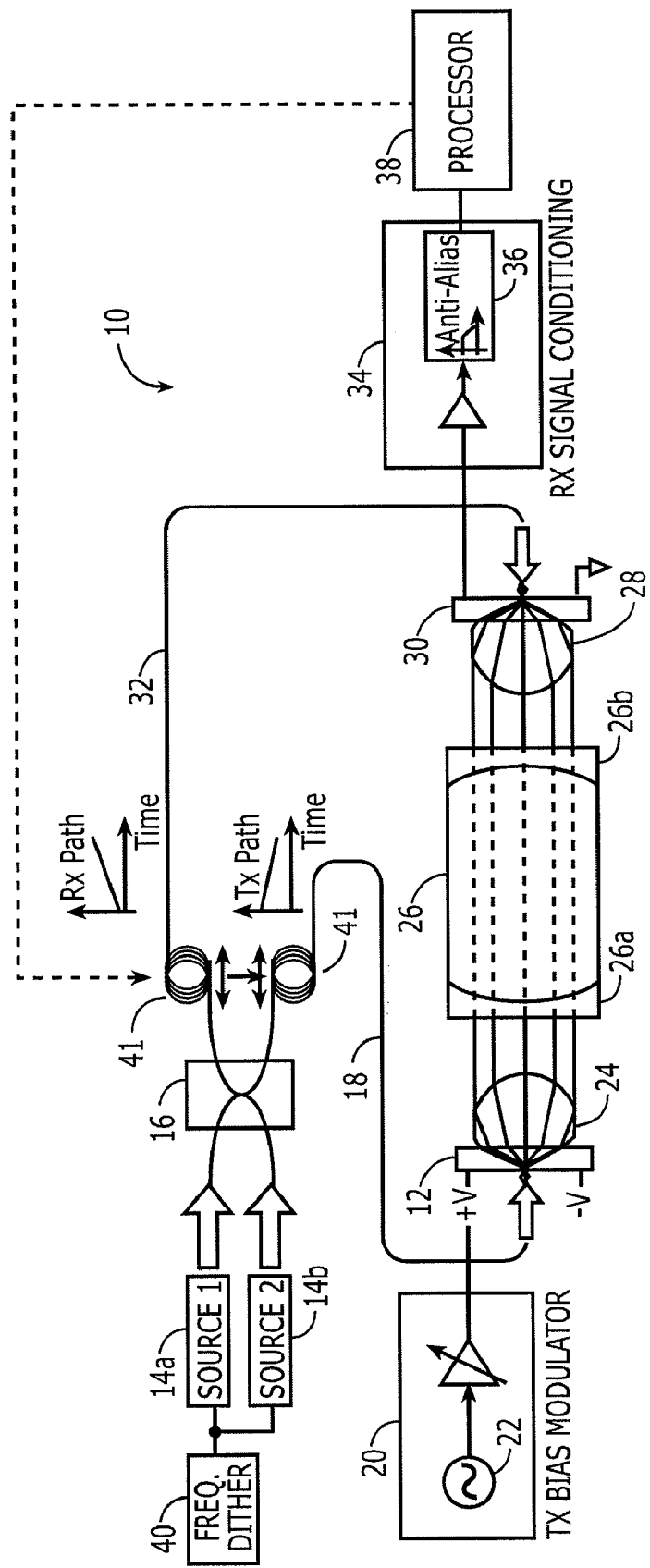
Figure 2:
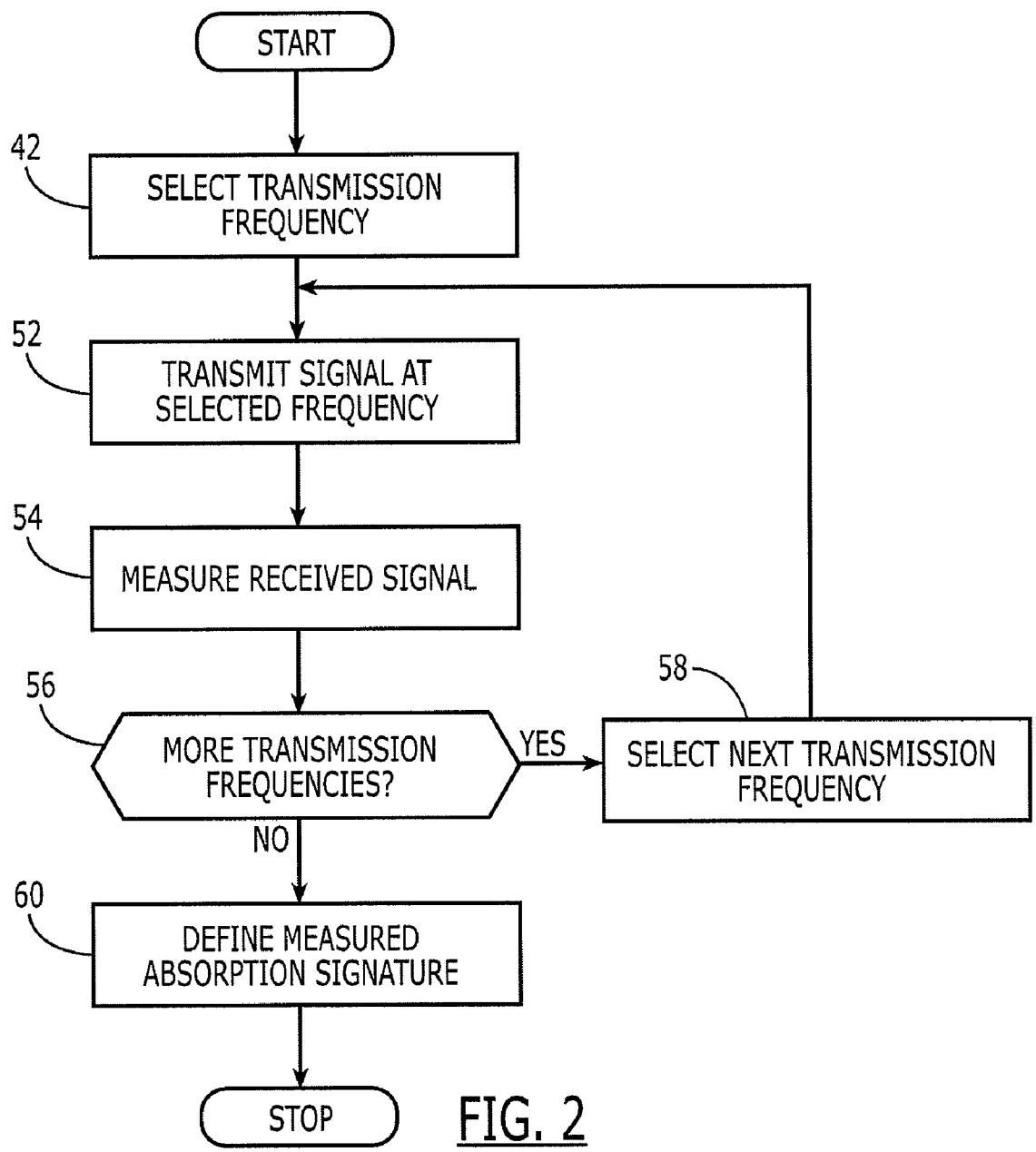
Figure 3:
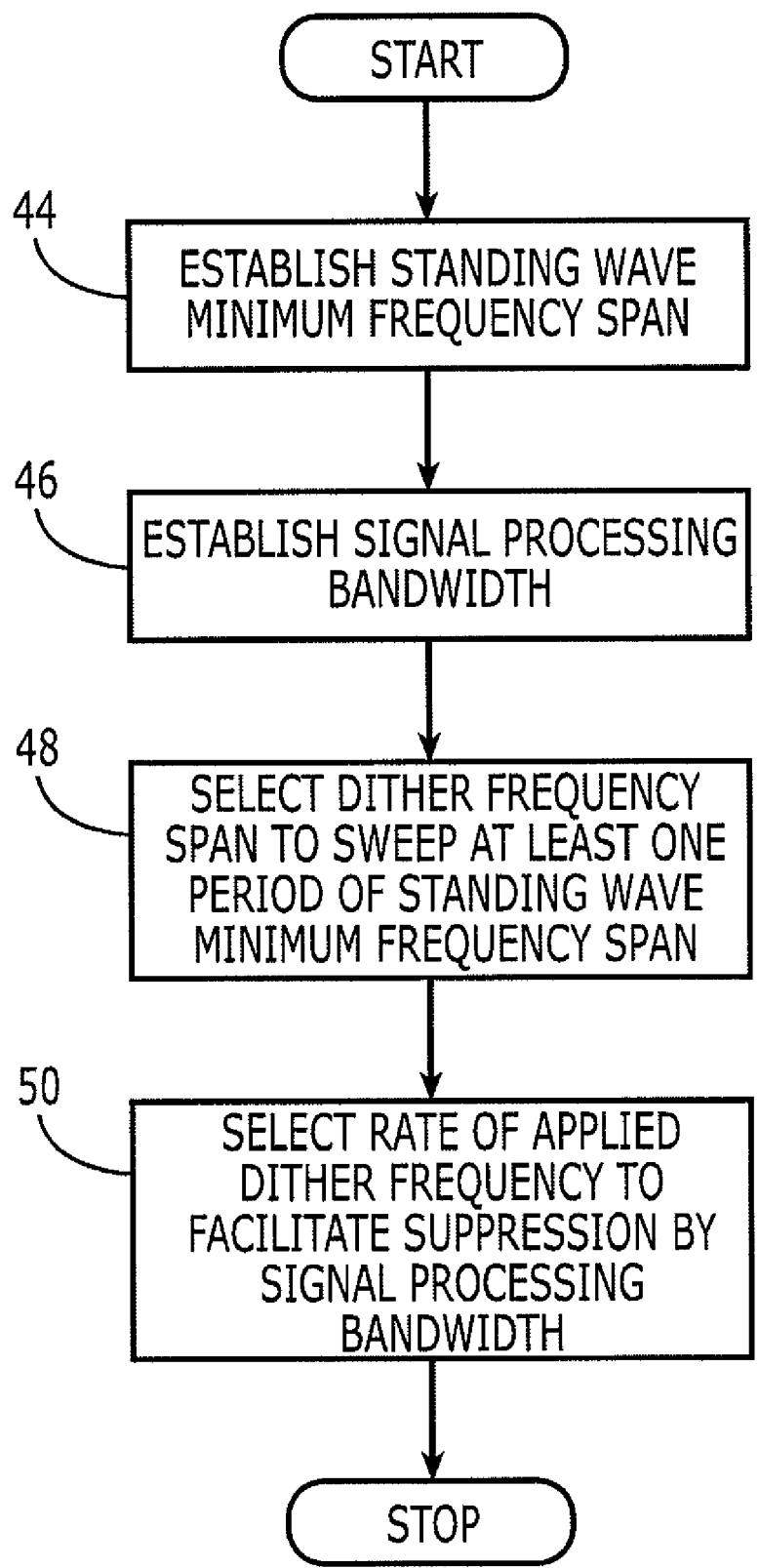
Figure 4:
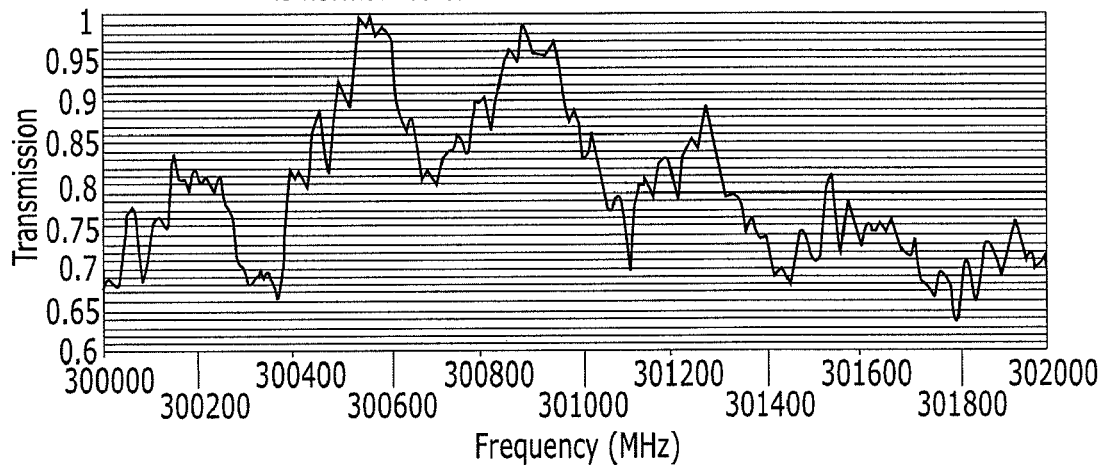
Figure 5:
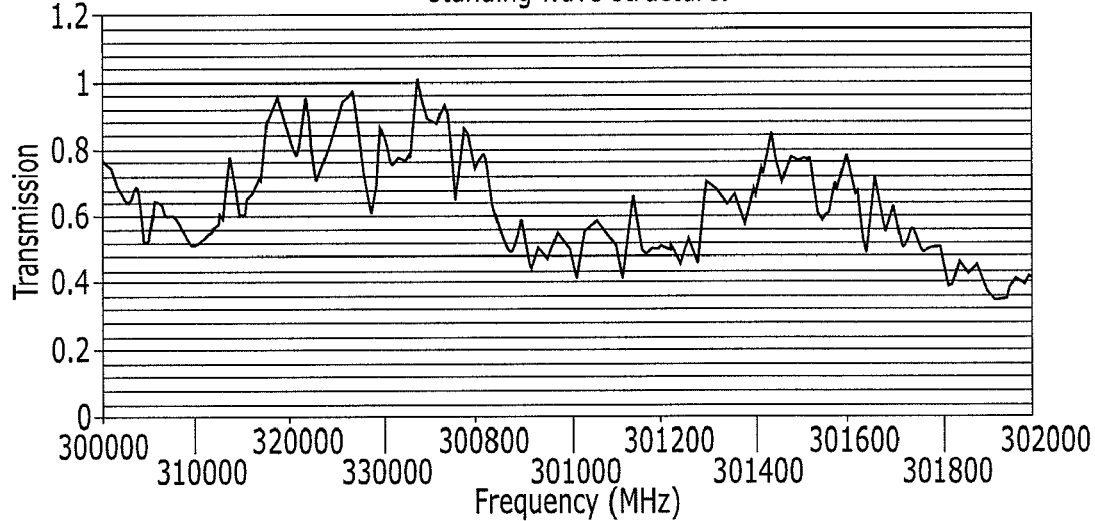
Figure 6A:
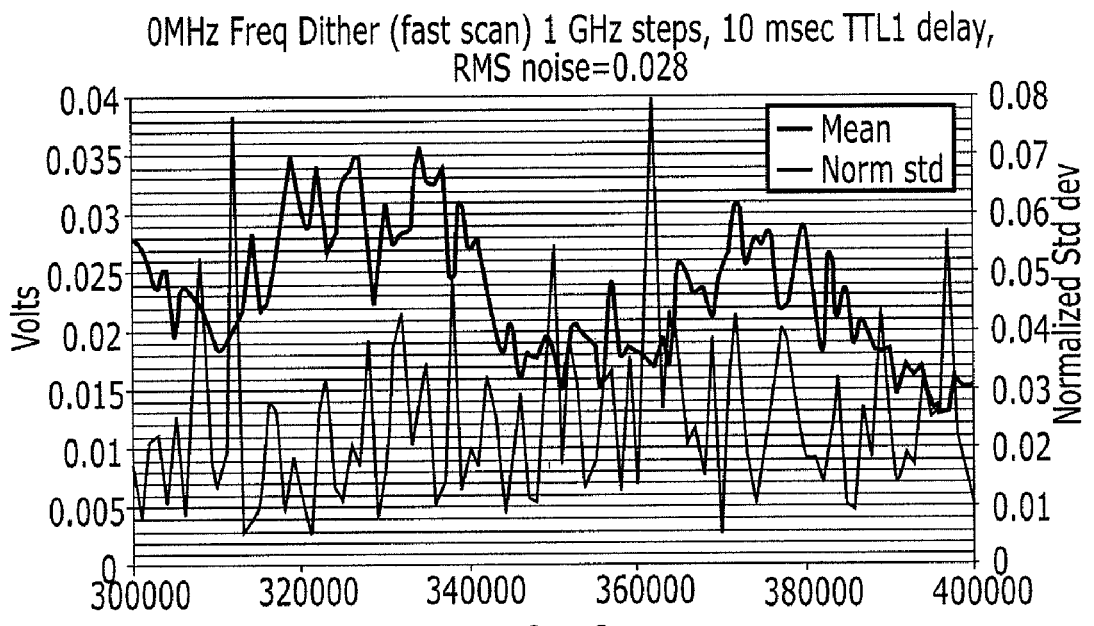
Figure 6B:
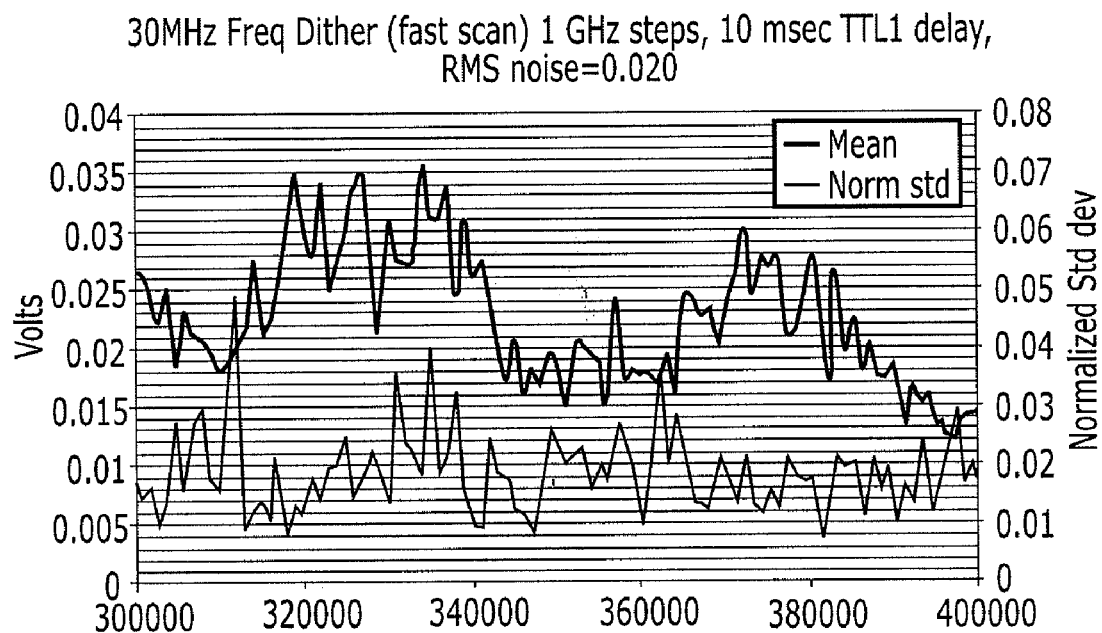
Figure 7:
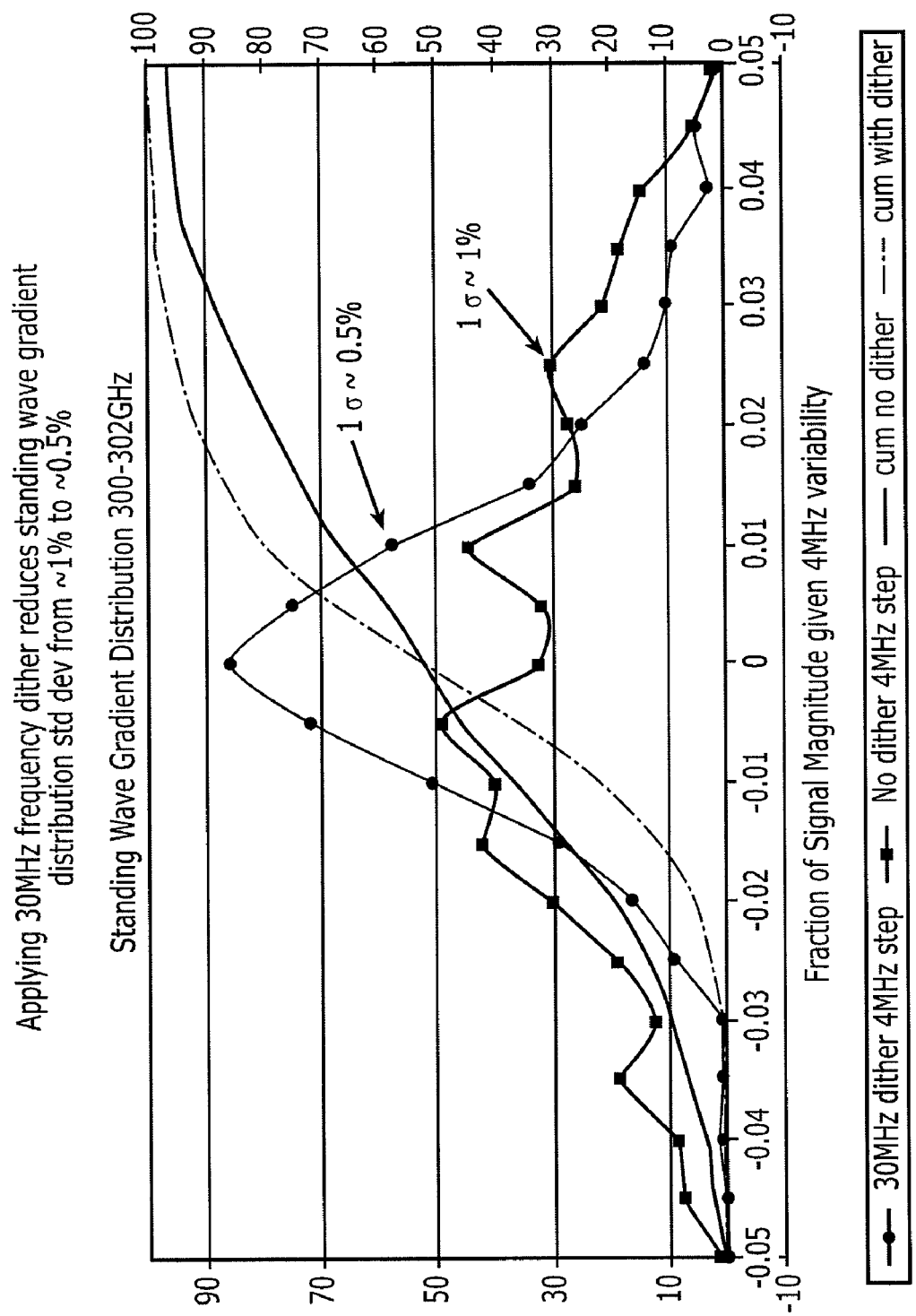
Figure 8:
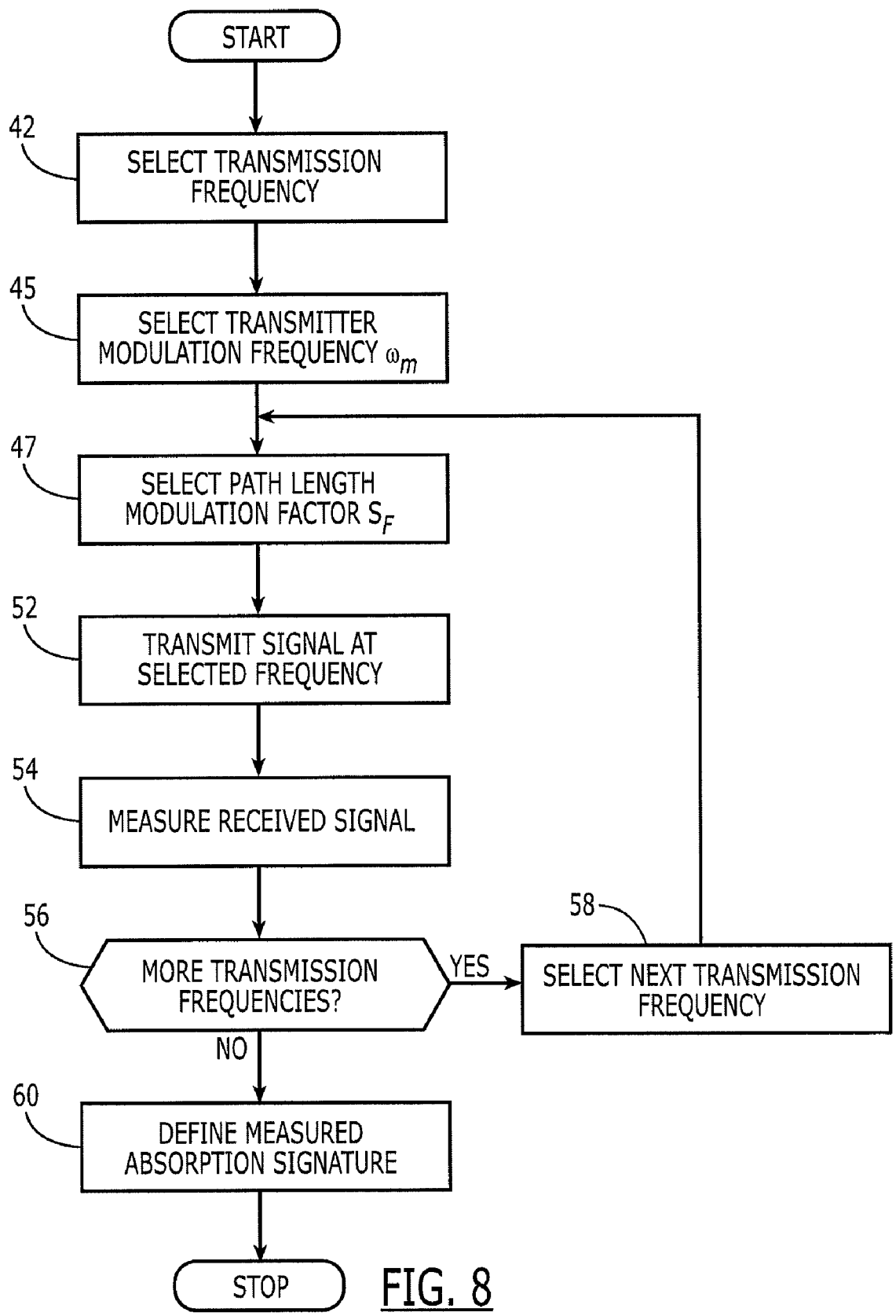
Figure 9:
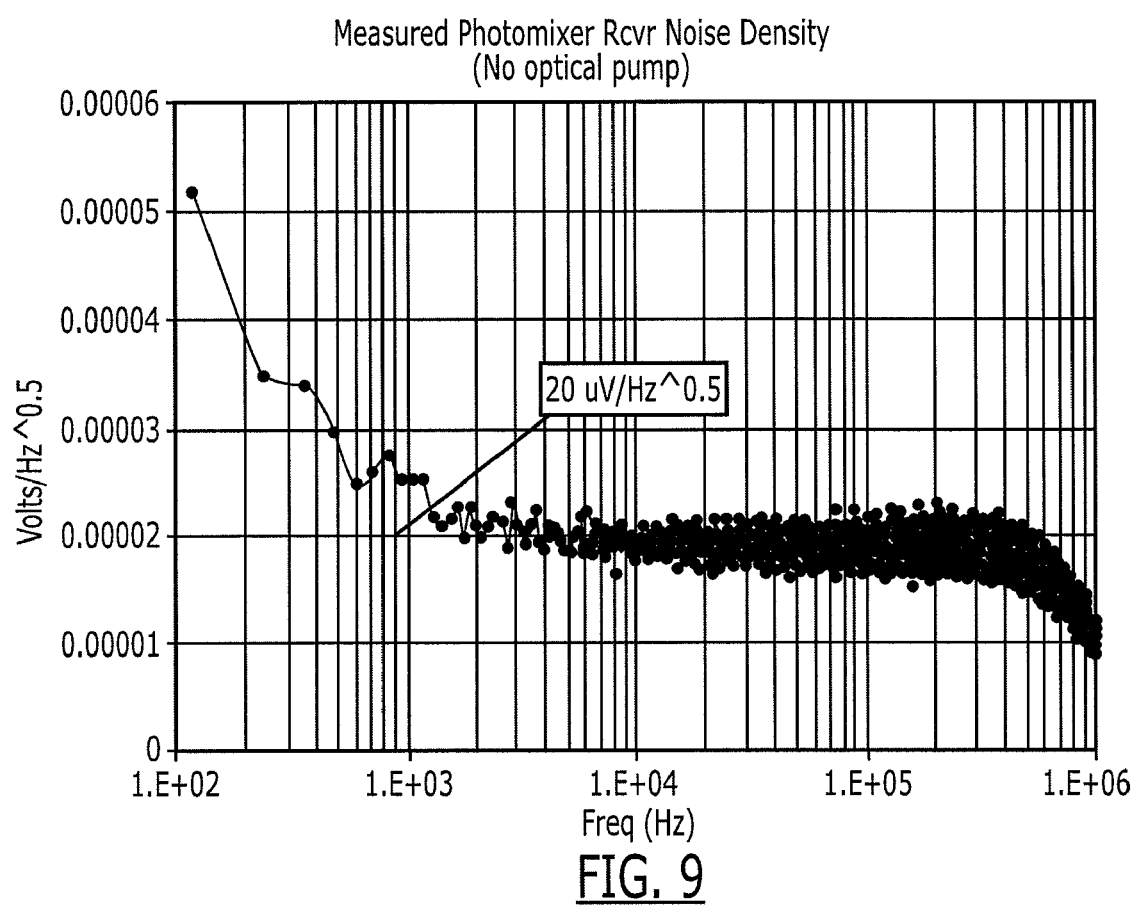
Figure 10:
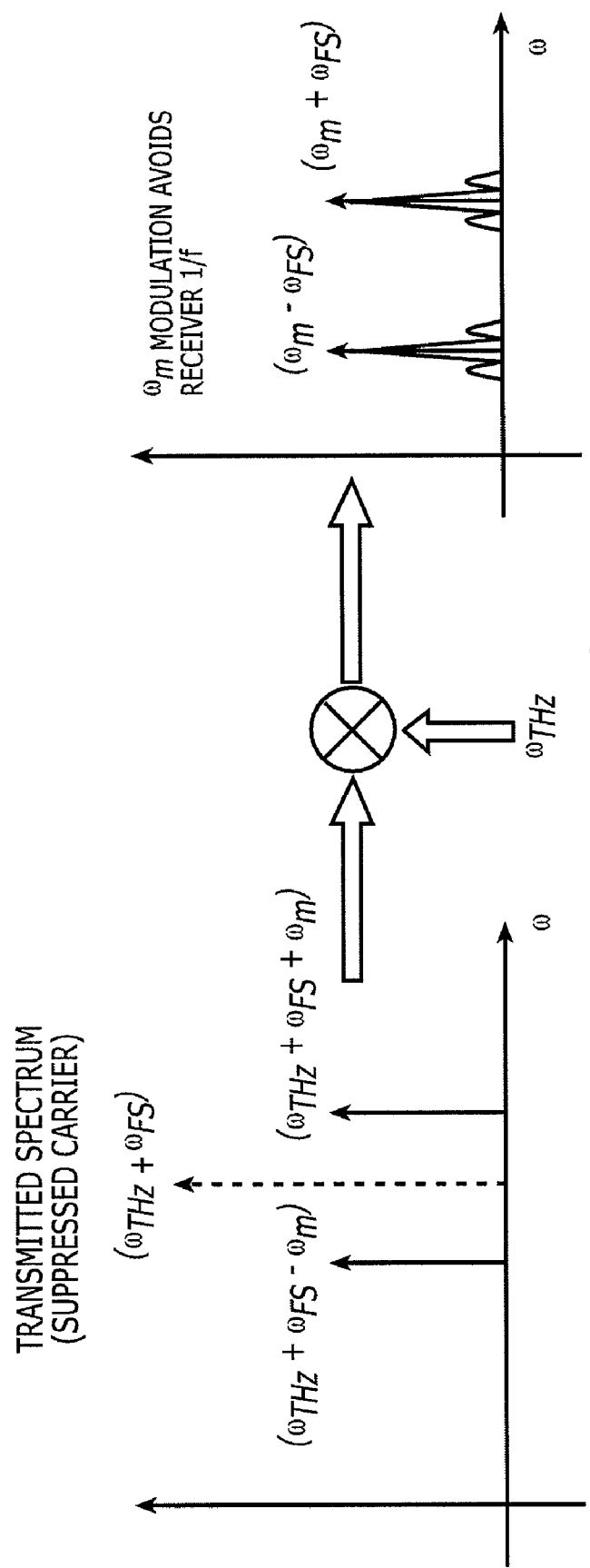

Having thus described the invention in general terms, reference will now be made to the accompanying drawings, which are not necessarily drawn to scale, and wherein:

FIG. 1 is a schematic block diagram of a spectrometer system in accordance with one exemplary embodiment of the present invention;

FIGS. 2, 3 and 8 are flowcharts illustrating various steps in a method of sweeping a spectrometer system through a frequency spectrum, according to exemplary embodiments of the present invention;

FIGS. 4 and 5 are graphs illustrating transmission of a scanning spectrometer system measured with 4 MHz resolution and 1 GHz resolution, respectively, according to exemplary embodiments of the present invention;

FIGS. 6a and 6b are graphs illustrating the mean and normalized standard deviation of several scans for the cases without and with dithering, respectively, demonstrating a reduction in the normalized standard deviation of approximately 28%, according to exemplary embodiments of the present invention;

FIG. 7 is a graph illustrating the distributions for instrument performance with and without the application of frequency dither, respectively;

FIG. 9 is a graph illustrating the measured noise density spectrum of a photomixer receiver, according to exemplary embodiments of the present invention; and FIG. 10 illustrates spectral diagrams illustrating frequency down conversion in the receiver of exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In this regard, reference may be made herein to a number of mathematical or numerical expressions that may be related by equality. It should be understood, however, that this equality may refer to an absolute or approximate equality, such that exemplary embodiments of the present invention may account for variations that may occur in the system and method, such as those due to engineering tolerances. Like numbers refer to like elements throughout.

FIGS. 1 and 2 illustrate a spectrometer system and method that may benefit from exemplary embodiments of the present invention. It should be understood, however, that the spectrometer system and method illustrated and hereinafter described are merely illustrative of one type of system and method that may benefit from exemplary embodiments of the present invention and, therefore, should not be taken to limit the scope of the present invention. In this regard, while several embodiments of the spectrometer system and method are illustrated and will be hereinafter described for purposes of example, other types of systems and methods of propagating electromagnetic signals may readily employ the present invention. Moreover, the system and method of the present invention will be primarily described in conjunction with signals in the THz (or mmW) region of the electromagnetic spectrum. But the system and method of embodiments of the present invention may be utilized in conjunction with a variety of other applications, both within and outside the THz region of the electromagnetic spectrum.

As shown, a spectrometer system 10 of one exemplary embodiment of the present invention includes a transmitter 12 configured to transmit a beam of electro-magnetic radiation at a given frequency. The transmitter can comprise any of a number of different transmitters known to those skilled in the art. In one exemplary embodiment, for example, the transmitter comprises a photomixer transmitter. In such instances, the transmitter includes a high-speed photoconductive diode (i.e., photomixer), which may be pumped with two laser sources 14a, 14b via a beam combiner/splitter 16 and an optically coupled first optical path 18 (e.g., optical fiber). In this regard, the laser sources may be configured to emit signals with electric fields having offsetting frequencies at $\omega_1$ and $\omega_2$.

The inherently quadratic nature of the cross-gap absorption creates a difference (i.e., transmission) frequency (i.e., $(\omega_2-\omega_1)$ in the photocurrent induced in the diode of the transmitter 12. The transmitter 12 may be coupled to a transmitter bias modulator 20 including a voltage source 22 configured to generate a sinusoidal modulated voltage (signal) with which the photomixer of the transmitter may be biased. By locating the photomixer at the driving point of an antenna, such as a spiral, dipole or slot antenna, the difference-frequency current is converted to difference-frequency photons. The result is a highly-tunable, continuous-wave (CW), highly-coherent source of radiation contained in a single (quasi-Gaussian) spatial mode. For more information on such a transmitter, see U.S. Pat. No. 6,348,683 entitled: Quasi-Optical Transceiver Having an Antenna with Time Varying Voltage, issued Feb. 19, 2002.

Thus, the method of one embodiment includes selecting a transmission frequency, thereafter transmitting a beam of electromagnetic radiation (i.e., source beam) at that frequency from the transmitter 12, as shown in blocks 42 and 52 of FIG. 2. The transmission frequency can be selected in any of a number of different manners. To detect a sample based upon a measured absorption signature, however, the transmission frequency may be typically selected within a range of frequencies over which the absorption signature is defined. In a photomixer transmitter, then, the photomixer can be pumped with a laser source at a frequency $\omega_1$, and a laser source at a frequency $\omega_2$ that are tuned to thereby select the difference, or transmission, frequency (i.e., $\omega_2-\omega_1$).

The beam of radiation from the transmitter 12 may pass through a collimating lens 24 to produce a collimated beam of radiation. The beam may then pass through a sample cell 26 that may be bounded by reflectors 26a and 26b through which the beam passes, and that may include a sample medium to be analyzed and a base medium, such as ambient air. As will be appreciated, the sample and base medium can have any of a number of different forms through which the beam of radiation is at least partially transmissive. For example, the sample and base medium can comprise a solid, liquid, gas, plasma or aerosol. More particularly, in various advantageous embodiments, the base medium of ambient air may be in gas form, while a sample may be in gas or aerosol form.

As the beam of radiation passes through the sample cell 26, the sample and base medium in the sample cell absorb at least a portion of the beam, or more particularly at least a portion of the electric field of the beam. The remaining, unabsorbed portion of the beam of radiation (i.e., received signal) then exits the sample cell. The sample signal then propagates to a focusing lens 28, from which the focused signal is picked up or otherwise received by a receiver 30.

The receiver obtains a measurement representative of the received electric field $E_{RP}$, as shown in block 54 of FIG. 2. Similar to the transmitter 12, the receiver may comprise an electric-field detector such as a photomixer receiver (homodyne receiver). The photomixer receiver may include an antenna configured to receive the electric field and generate a corresponding voltage in response thereto, which may be directed to a high-speed photoconductor. The photoconductor is also electrically coupled to a second optical path 32 for pumping the photoconductor with beams from the same two laser sources 14a, 14b pumping the photomixer transmitter 12. In this regard, the beam combiner/splitter 16 may separate each of the signals from the laser sources into the aforementioned first optical path 18, as well as another, second optical path (e.g., optical fiber) for pumping the receiver photomixer. These signals, then, may modulate a conductance of the photomixer. The voltage generated by the receiver antenna may be applied to the photomixer active material, and produce a current through the modulated conductance that is the product of the received signal and the receiver photomixer conductance. For more information on such a receiver, see the aforementioned '683 patent.

The down-converted signal current and/or electric-field (or signal) may be applied to receiver signal conditioning circuitry 34 including, for example, an anti-aliasing filter 36. The output of the signal conditioning circuitry may then be input to a processor 38, such as for performing digital signal processing operations thereon. In this regard, the processor can comprise any of a number of different processing devices capable of operating in accordance with exemplary embodiments of the present invention. For example, the processor can comprise a computer (e.g., personal computer, laptop computer, server computer, workstation computer), microprocessor, coprocessor, controller, a specialized digital signal processor and/or various other processing devices including integrated circuits such as an ASIC (application specific integrated circuit), FPGA (field programmable gate array) or the like.

In operation as a spectrometer, the system 10 scans through a number of transmission frequencies in a range of frequencies (frequency spectrum), such as by pumping the photomixers of the transmitter 12 and receiver 30 with a laser source at frequency $\omega_1$, and a second laser source at frequency $\omega_2$ that are tuned to scan through a number of frequencies, as shown in blocks 56 and 58 of FIG. 2. For each transmission frequency in the range of frequencies, and thus each beam of radiation having a different transmission frequency, the processor 38 may measure the amplitude and/or phase of the down-converted signal current $I_{Down}$. The resulting collection of transmissions amplitudes and/or phases, and associated transmission frequencies, may define a measured absorption or dispersion signature for the sample in the sample cell 26, from which the sample may be identified, as shown in block 60 of FIG. 2.

As explained in the background section, a negative consequence of long coherence lengths of the pump sources (sources 14a, 14b) of spectrometer systems is that such systems may exhibit the transmission modulation resulting from reflections from spurious resonant cavities. A significant and often dominant noise source may be the random amplitude variation resulting from source frequency random jitter and repeatability error coupled with the standing wave transmission modulation (intensity gradients) of these spurious cavities. Spurious cavities may be formed by Fresnel reflections from any surfaces between the transmitter 12 and receiver 30 electromagnetic wave propagation path, such as from lenses 24, 28, reflectors 26a, 26b or the like. The reflectivity of these surfaces may be difficult to suppress because of the wide frequency range covered in the THz spectrometer making anti-reflective (AR) coatings ineffective.

Exemplary embodiments of the present invention therefore provide an apparatus and method of reducing noise resulting from source frequency random jitter coupled with systematic transmission modulation (standing waves) as a function of frequency. According to exemplary embodiments, the spectrometer system 10 further includes a frequency dither circuit 40 that may modulate the frequency of either or both of sources 14a, 14b. The frequency dither circuit may be configured to apply a frequency dither to the beams propagating in either or both of the optical paths 18, 32 to thereby generate amplitude modulation from standing waves at a rate that is beyond the cut-off frequency of the receiving electronics. The signal conditioning circuitry 34 or processor 38, then, may be configured to average the received and down-converted signal $E_R$ over the standing wave structure, such as by selecting a dither modulation frequency significantly above the signal processing bandwidth that is designed to sample the transmitted signal without aliasing or significant loss of signal amplitude. The resulting measured signal may produce an attenuated random component of the systematic standing wave artifacts.

Consider, for example, the reflectors 26a, 26b as creating a spurious cavity in the spectrometer system 10. The transmission modulation period generated by the reflective surfaces may be inversely proportional to the effective separation distance between them, and may be expressed as:

$$F_p = \frac{c}{2nL} \quad (1)$$

where c represents speed of light ($c \approx 3 \times 10^8$ m/s), n represents index of refraction of the effective propagation media, $F_p$ represents the modulation period in Hz, and L represents separation distance between reflectors. This modulation period may also be referred to as the cavity Free Spectral Range (FSR). Spectrometers systems 10 designed for high sensitivity may have path lengths of multiple meters, where a 10 meter path length sample cell 26 (L=10 m) may generate spurious modulation periods as short as 15 MHz ($F_p$=15 MHz).

Modulation depth may be considered the peak-to-valley amplitude of a signal. The modulation depth of spurious cavities may be dependent on the reflectivity of the surfaces creating the cavities, where the transmission function for a set of parallel flat reflecting surfaces may be the well known Fabry-Perot etalon transmission function. The field amplitude depth $M_d$ of modulation in a simple flat-flat cavity at normal incidence can be shown to be approximately the following:

$$M_d \approx \left[\frac{(n-1)^2}{(n^2+1)}\right] \quad (2)$$

For indices of refraction as high as 3.5 (as in Silicon used for the photomixer lenses 24, 28), 47% modulation depths can be achieved. Multiple reflecting surfaces typically found in any spectrometer design may generate greater complexity and variation in modulation depth of the transmission function by way of interference among multiple cavities, and these spectral features are often referred to as standing wave patterns.

Measured transmission from a scanning CW spectrometer, shown in FIG. 4, illustrates the complex function of the standing waves. As shown, a 4 MHz sampling distance may provide sufficient frequency resolution to allow observation of the shortest periods of the standing wave modulations. The measurement shown in FIG. 5 is sampled at 1 GHz and displays an aliased or undersampled transmission function over a larger frequency range. The high-resolution data may be therefore desired so as to confirm equation (1) and confidently allow selection of a dither frequency span that may be used to reduce noise per exemplary embodiments of the present invention.

According to exemplary embodiments of the present invention, then, before the laser sources 14a, 14b pump the photomixer transmitter 12 to thereby transmit a beam of radiation at a selected frequency (see FIG. 2, block 52), a frequency dither may be selected for application by the frequency dither circuit 40 to beams (i.e., signals) from the laser sources that propagate in one or both of the optical paths 18, 32. The frequency dither may be selected according to a number of different methods, one exemplary method being shown in FIG. 3. As shown at block 44, a method of selecting a frequency dither may include determining an expected standing wave minimum frequency period (i.e., FSR). This minimum frequency period may be determined according to equation (1), and/or measurement of the spectrometer transmission function at more than the Nyquist rate—at least two samples per period according to equation (1).

As shown in block 46, the method may also include determining the signal processing bandwidth used for sampling the frequency spectrum (the spectrum of frequencies through which the system 10 scans). This bandwidth may be determined in a number of different manners, but in one exemplary embodiment, is determined as that required to process the transmitter bias modulator 20 signal with minimal attenuation. In one example, this modulation may be selected at 100 KHz for reasons related to the 1/f noise performance of the receiving electronics. The signal processing bandwidth of the receiver in this example may then be selected at 300 KHz to achieve less than 1 dB of loss at 100 KHz.

After determining the standing wave minimum frequency period (i.e., FSR), the dither frequency span may be selected as a function of the standing wave minimum frequency period, so as to sweep at least one period of the standing wave minimum frequency period, as shown in block 48. For example, the dither frequency span may be selected as at least 15 MHz for a 15 MHz FSR. In addition, modulation depth $M_d$ may be taken into account when selecting the dither frequency span. In this regard, the dither frequency span may be selected to not only sweep at least one period of the standing wave minimum frequency period, but to also span periods of deep modulation depth so as to reduce the peak-to-valley amplitudes of the expected standing wave.

And after determining the signal processing bandwidth, the dither frequency may be selected as a function of the signal processing bandwidth. In this regard, the dither frequency may be selected larger than the signal processing bandwidth to facilitate, if not ensure, noise suppression by the signal processing bandwidth, as shown in block 50. The level above the signal processing bandwidth at which the dither modulation frequency is selected may be determined, selected or otherwise identified in any of a number of different manners, such as based upon a desired attenuation of the dither modulation signal at the selected modulation frequency. In this regard, the signal processing bandwidth and transfer function may be used to determine the attenuation of the dither modulation signal at the selected modulation frequency. For a first-order signal processing filter transfer function, for example, a modulation frequency of ten times the −3 dB roll-off frequency may provide −20 dB of modulation attenuation. Higher dither frequencies may result in greater attenuation.

Noise performance improvement may be determined by the frequency jitter spectrum of the transmitter 12, the dither frequency span, and the transmission standing wave function of the spectrometer system 10. Dither frequency span may sweep the span of one or more integer multiples of the period of the standing wave pattern. The transmission modulation minimum period (dither frequency span) may be estimated from equation (1) or evaluated from a high resolution scan such as that shown in the 4 MHz sampled transmission above. An example of the improvement that may be achieved is shown in the measured data displayed in FIGS. 6a and 6b (FIG. 6a illustrating the case without dithering, and FIG. 6b illustrating the case of a 30 MHz dither). FIGS. 6a and 6b present the mean value of several scans that sample the spectrum with 1 GHz resolution from 300 GHz to 430 GHz. In this example, the transmitted frequency has an applied dither modulation frequency that linearly frequency modulates the transmitter by +/−30 MHz about the nominal set frequency. Given the spectrometer receiver electronics bandwidth, the dither modulation frequency is applied at a 1 MHz rate. Also in the illustrated example, dwell time at each sampled frequency is 0.03 seconds, which may allow for significant averaging of the dither modulation by the receiver effective signal bandwidth of 30 Hz. FIGS. 6a and 6b also include the normalized standard deviation of the set of scans (represented by the dotted line). A reduction in the normalized standard deviation (i.e., improvement in noise reduction) may be manifested in a lower value when dither is applied.

Evaluation of the reduction in standing wave-frequency jitter noise may also be demonstrated by a statistical analysis of the instrument data, or more specifically for example, through the distribution of the magnitude of the transmission gradient (standing wave FSR) between sample points. FIG. 7 shows the distributions for instrument performance with and without the application of frequency dither. In this example, a 50% reduction in expected noise may be achieved.

According to other exemplary embodiments, the spectrometer system 10 may further include a path length modulation arrangement 41 along either the first optical path 18 or the second optical path 32, or as shown, or along each of the first and second optical paths. Exemplary embodiments may apply path length modulation to either or both of the optical paths, and in equal or differing amounts, to thereby effectuate a total system path length stretch. In this regard, when simultaneously applying modulation to both of the optical paths, the resulting system path modulation or stretch may correspond to the difference of the modulation applied to the first and second optical paths, and may require contraction (decreasing the length) of one of the paths as the other path is stretched (increasing the length).

The path length modulation arrangement 41 may comprise any of a number of apparatuses configured to dynamically stretch or contract an optical path length. In one exemplary embodiment in which an optical path includes an optical fiber, the path length modulation arrangement may comprise a spool about which the fiber may be wound, and an actuator (e.g., piezoelectric actuator) coupled to the spool configured to stretch the diameter of the spool and thus the length of the fiber wound thereabout. In such instances, contraction of the optical fiber may be effectuated by reducing a previously-applied stretch to the spool and thus the fiber.

According to these exemplary embodiments of the present invention, then, before the laser sources 14a, 14b pump the photomixer transmitter 12 to thereby transmit a beam of radiation at a selected frequency (see FIG. 2, block 52), and before or after the frequency dither is selected (see FIG. 3), a path length rate scale factor $S_F$ may be selected, such as by the processor 38, as shown in block 47 of FIG. 8. The path length rate scale factor represents the rate of applying a system stretch (stretch of one or both optical paths, or stretch of one path coupled with contraction of the other path) during the dwell time at each frequency sample point of the scanned spectrum (i.e., the amount of time the system operates at each frequency sample point before moving to the next point).

The path length rate scale may be selected in any of a number of different manners to effectuate a desired path length modulation, such as in a manner so as to span one or more waves of the pump signal (at the difference frequency) within the optical paths 18, 32 over the dwell time at each frequency sample. More particularly, for example, the path length rate scale may be selected as an integer multiple of the period of the pump signal, such as in accordance with the following:

$$S_F = \frac{a\lambda_{THz}}{D} \quad (3)$$

where a represents a selectable integer multiple (e.g., 3), $\lambda_{THz}$ represents the wavelength of the pump signal at the difference frequency, and D represents the dwell time (e.g., 0.03 sec.). Written in terms of the difference frequency $f_{THz}$, the path length rate scale may be selected as follows:

$$S_F = \frac{a}{D} \frac{c}{f_{THz} n_f} \quad (4)$$

where $n_f$ represents the index of refraction of the propagating medium of the optical path (e.g., approximately 1.5 for optical fiber). Consider for example, an instance in which a=3, D=0.03 s, $f_{THz}$=650 GHz, and $n_f$=1.5. In such an instance, given c=3×10$^8$ m/s, the path length rate scale factor $S_F$ may be selected as approximately 30.77 mm/s.

As relatively low frequencies of the path length modulation may result in increased noise in the spectrometer system 10, before, as or after the path length rate scale factor is selected, a transmitter modulating frequency $\omega_m$ may be selected so as to elevate the signal carrier above the 1/f noise region of the receiver electronics, as shown in block 45. This selection of the modulating frequency may permit the system to at least partially avoid increased noise at relatively low frequencies of the path length modulation. The transmitter modulating frequency may be selected in a number of different manners, such as from analysis of a measured noise density spectrum of the receiver. One example of a measured noise density spectrum is shown in the graph of FIG. 9. As shown, the 1/f noise region of the receiver electronics is at approximately 1 kHz. And from this exemplary noise density spectrum, it may be shown that a transmitter modulation frequency $\omega_m$ at or above 10 kHz may be needed to at least partially avoid excess 1/f noise.

Having selected the path length rate scale factor $S_F$ and transmitter modulating frequency $\omega_m$, the method may proceed similar to before, including transmitting a beam of radiation (i.e., source beam) at a selected transmission frequency, as shown in block 52 of FIG. 8. As the beam of radiation is transmitted during the dwell time of the selected transmission frequency, the processor 38 may control the path length modulation arrangement(s) 41 (or more particularly, for example, the actuator(s) of the arrangements) to stretch and/or contract the first optical path 18 and/or the second optical path 32 to effectuate a total system path length stretch. In such an instance, the emitted signals $E_{\omega 1}$ and $E_{\omega 2}$ may be represented as follows:

$$E_{\omega 1} = E_1 \cos(\omega_1 t + \omega_{FS} t + \phi_{1T}) \quad (5)$$

$$E_{\omega 2} = E_2 \cos(\omega_2 t + \omega_{FS} t + \phi_{2T}) \quad (6)$$

where $E_1$ and $E_2$ represent the electric-field amplitudes of the beams from the first and second sources, respectively; and $\phi_{1T}$ and $\phi_{2T}$ represent phase constants introduced by virtue of propagation of the beams through the first optical path. Also in the preceding, $\omega_{FS}$ represents the path length modulation frequency at the difference frequency, which may be represented as follows:

$$\omega_{FS} = \frac{2\pi}{\lambda_{THz}} n_F S_F \quad (7)$$

Further note that frequencies $\omega_1$ and $\omega_2$ may be expressed as angular frequencies, or as corresponding temporal frequencies (f=ω/2π). The difference (i.e., transmission) frequency (i.e., $\omega_2 - \omega_1$) in the photocurrent induced in the diode of the transmitter 12, then, may have a corresponding electric field:

$$E_T = \eta_T E_1 E_2 \cos((\omega_{THz} + \omega_{FS})t + \phi_{12T}) \quad (8)$$

where $\eta_T$ represents the photomixer transmitter conversion efficiency, $\omega_{THz} = \omega_2 - \omega_1$, and $\phi_{12T} = \phi_{2T} - \phi_{1T}$.

Similar to before, the transmitter 12 may be coupled to a transmitter bias modulator 20 including a voltage source 22 configured to generate a sinusoidal modulated voltage with which the photomixer of the transmitter may be biased, the modulator producing an electric field $E_M = V_m \cos(\omega_m t)$. The transmitted electric field, then, may be represented as the product of $E_T$ and $E_M$, as follows:

$$E_{TM} = V_m \cos(\omega_m t)\eta_T E_1 E_2 \cos((\omega_{THz} + \omega_{FS})t + \phi_T) \quad (9)$$

$$E_{TM} = \frac{V_m \eta_T E_1 E_2}{2} \quad (10)$$
$$[\cos((\omega_{THz} + \omega_{FS} + \omega_m)t + \phi_T) + \cos((\omega_{THz} + \omega_{FS} - \omega_m)t + \phi_T)]$$

In equations (9) and (10), $\phi_T$ represents the sum of $\phi_{12T}$ and some phase delay related to the photomixer and antenna transfer function.

The beam of radiation from the transmitter may, as before, pass through the collimating lens 24 and sample cell 26. A portion of the beam of radiation may exit the sample cell, pass through the focusing lens 28, and be picked up or otherwise received by the receiver 30, as shown at block 50. This received signal $E_{RP}$ may be represented as follows:

$$E_{RP} = \frac{V_m \eta_T E_1 E_2}{2} \left[ \begin{array}{l} \cos\left((\omega_{THz} + \omega_{FS} + \omega_m)t + \phi_T - 2\pi\frac{L}{\lambda_{THz+}}\right) + \\ \cos\left((\omega_{THz} + \omega_{FS} + \omega_m)t + \phi_T - 2\pi\frac{L}{\lambda_{THz-}}\right) \end{array} \right] \quad (11)$$

where $\lambda_{THz+}$ and $Z_{THz-}$ in this case represent the wavelengths of the signal sidebands (upper and lower) at the frequencies $\omega_{THz} + \omega_{FS} + \omega_m$ and $\omega_{THz} + \omega_{FS} - \omega_m$, respectively.

The receiver 30 may receive the electric field and generate a corresponding voltage in response thereto. The voltage generated by the receiver may be applied to the photomixer active material, and produce a current through the modulated conductance that is the product of equations (11) and the following:

$$G_{RP} = \eta_R E_1 E_2 \cos(\omega_{THz} t + \phi_{12R}) \quad (12)$$

where $\eta_R$ represents the photomixer receiver conversion efficiency, and $\phi_{12R} = \phi_{2R} - \phi_{1R}$, $\phi_{1R}$ and $\phi_{2R}$ representing phase constants introduced by virtue of propagation of the beams through the second optical path. The difference frequency result of the product is the down-converted signal current $I_{Down}$, which may be represented as follows:

$$I_{Down} = \frac{E_{RPmp}G_{RPmp}}{2}\left[\begin{array}{l}\cos\left((\omega_m+\omega_{FS})t+\varphi_T-2\pi\dfrac{L}{\lambda_{THz+}}-\varphi_{12R}\right)+\\ \cos\left((\omega_m-\omega_{FS})t-\varphi_T+2\pi\dfrac{L}{\lambda_{THz-}}+\varphi_{12R}\right)\end{array}\right] \quad (13)$$

where, $$E_{RPmp} = \frac{V_m\eta_T E_1 E_2}{2} \text{ and } G_{RPmp} = \eta_R E_1 E_2$$

The corresponding down-converted electric-field (or signal) $E_R$, then, may be calculated as according to the following:

$$E_R = I_{Down}R_{Load} \quad (14)$$

which may be simplified as follows:

$$E_R = E_o[\cos((\omega_m+\omega_{FS})t+\phi)+\cos((\omega_m-\omega_{FS})t-\phi)] \quad (15)$$

In the preceding, $E_o$ and $\phi$ may be represented as follows:

$$E_o = \frac{1}{2}E_{RPmp}G_{RPmp}R_{Load}$$

$$\phi = \phi_T - 2\pi\frac{L}{\lambda_{THz}} - \phi_{12R}$$

where $R_{Load}$ represents the receiver 30 electronic load resistance. This result is the mixing product of the receiver photomixer as illustrated in the spectral diagrams of FIG. 10.

Also as before, the down-converted signal current $I_{Down}$ and/or electric-field (or signal) $E_R$ may be applied to receiver signal conditioning circuitry 34 and then input to a processor 38, and may include recovery of the amplitude of the down-converted signal $E_R$. In equation (15), the constant phase term $\phi$ may vary with path length drift as a function of temperature and mechanical disturbances. By performing path length modulation according to exemplary embodiments of the present invention, the received signal amplitude may be extracted at much higher frequencies than any path drift affecting signal phase. For more information on further aspects that may be applicable to exemplary embodiments of the present invention, see U.S. patent application Ser. No. 12/234,121, entitled: System and Method for Signal Extraction by Path Modulation, filed concurrent with the present application, the content of which is hereby incorporated by reference in its entirety.

Similar to before, the system 10 may scan through a number of transmission frequencies in a range of frequencies, as shown in blocks 56 and 58 of FIG. 8. As the path length rate scale factor $S_F$ may be selected as a function of the transmission frequency (see equation (4)), the path length rate scale factor may be re-selected for each transmission frequency and may differ from one transmission frequency to the next. For each transmission frequency in the range of frequency, and thus each beam of radiation having a different transmission frequency, the processor 38 may measure the amplitude and/or phase of the down-converted signal current $I_{Down}$. The resulting collection of transmissions amplitudes and/or phases, and associated transmission frequencies, may define a measured absorption or dispersion signature for the sample in the sample cell 26, from which the sample may be identified, as shown in block 60 of FIG. 8.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   a transmitter and receiver, the transmitter being configured to transmit an electromagnetic signal to the receiver at each of one or more selectable frequencies, the system including a cavity along a propagation path of the electromagnetic signal between the transmitter and the receiver; and
   a frequency dither circuit configured to apply a frequency dither to the electromagnetic signal transmitted from the transmitter to the receiver at each of the one or more selectable frequencies, the applied frequency dither having a selected span and rate, the span having been selected as a function of a minimum frequency period of an expected standing wave in the system, and the rate having been selected as a function of a signal processing bandwidth for sampling a frequency spectrum including the one or more selectable frequencies.

2. A system according to claim 1, wherein the frequency dither circuit is configured to apply the frequency dither with a span having been selected as at least the minimum frequency period, the minimum frequency period having been determined as a function of a free spectral range of the cavity, or from measurement of a transmission function of the system.

3. A system according to claim 1, wherein the frequency dither circuit is configured to apply the frequency dither with a span having been selected also based upon a modulation depth of the expected standing wave.

4. A system according to claim 1 further comprising:
   a transmitter bias modulator configured to generate a modulated signal for biasing the transmitted electromagnetic signal, wherein the frequency dither circuit is configured to apply the frequency dither with a rate having been selected as greater than the signal processing bandwidth, the signal processing bandwidth having been determined based upon the modulated signal.

5. A system according to claim 1, wherein the receiver is configured to average the electromagnetic signal at the dither frequency received thereat.

6. A system according to claim 1, wherein the transmitter and receiver comprise a photomixer transmitter and a photomixer receiver of a spectrometer system.

7. A system according to claim 1, wherein the system includes a first propagation path of the electromagnetic signal to the transmitter, and a second propagation path of the other electromagnetic signal to the receiver, and wherein the system further comprises:
   an arrangement located along either of the first or second propagation paths, or along each of the first and second propagation paths, the arrangement configured to alter the length of a respective propagation path such that the difference of the lengths of the first and second propagation paths is altered at a pre-selected rate during transmission of the electromagnetic signal from the transmitter to the receiver, and receipt of the electromagnetic signal and the other electromagnetic signal at the receiver.

8. A system according to claim 7, wherein the pre-selected rate comprises a rate selected as a function of the frequency at which the electromagnetic signal is transmitted.

9. A system according to claim 8, wherein the pre-selected rate comprises a rate selected to span one or more periods of the electromagnetic signal transmitted at a respective frequency over a dwell time.

10. A system according to claim 7, wherein the pre-selected rate comprises a rate $\omega_{FS}$ selected to effectuate a path length modulation at a frequency:

$$\omega_{FS} = \frac{2\pi}{\lambda} n_F S_F$$

where $\lambda$ represents the wavelength of the electromagnetic signal at a respective frequency, $n_F$ represents the index of refraction of a propagating medium of the propagation paths, and $S_F$ represents the pre-selected rate.

11. A method comprising:
selecting a frequency dither, including:
selecting a span of the frequency dither as a function of a minimum frequency period of an expected standing wave in a system including a cavity along a propagation path of an electromagnetic signal between a transmitter and a receiver; and
selecting a rate of the frequency dither as a function of a signal processing bandwidth for sampling a frequency spectrum including one or more selectable frequencies; and
applying the frequency dither to an electromagnetic signal transmitted from the transmitter to the receiver at each of the one or more selectable frequencies, the applied frequency dither having the selected span and rate.

12. A method according to claim 11, wherein selecting a span comprises selecting a span of at least the minimum frequency period, the minimum frequency period being determined as a function of a free spectral range of the cavity, or from measurement of a transmission function of the system.

13. A method according to claim 11, wherein selecting a span comprises selecting a span also based upon a modulation depth of the expected standing wave.

14. A method according to claim 11 further comprising:
generating a modulated signal for biasing the transmitted electromagnetic signal, wherein selecting a rate comprises selecting a rate greater than the signal processing bandwidth, the signal processing bandwidth being determined based upon the modulated signal.

15. A method according to claim 11 further comprising averaging the electromagnetic signal received at the receiver.

16. A method according to claim 11, wherein applying the frequency dither comprises applying the frequency dither to an electromagnetic signal transmitted from the transmitter to the receiver of a spectrometer system including a photomixer transmitter and a photomixer receiver.

17. A method according to claim 11 further comprising:
selecting a rate of altering the difference of the lengths of first and second propagation paths, the first propagation path being of an electromagnetic signal to the transmitter configured to transmit the electromagnetic signal to the receiver, the receiver being configured to receive the electromagnetic signal and another electromagnetic signal for mixing therewith, and the second propagation path being of the other electromagnetic signal to the receiver; and
altering the length of either or both of the first or second propagation paths as the electromagnetic signal is transmitted from the transmitter to the receiver, and the electromagnetic signal and the other electromagnetic signal are received at the receiver, either or both of the propagation paths being altered such that the difference of the lengths of the first and second propagation paths is altered at the selected rate.

18. A method according to claim 17, wherein selecting a rate comprises selecting a rate as a function of the frequency at which the electromagnetic signal is transmitted.

19. A method according to claim 18, wherein selecting a rate comprises selecting a rate to span one or more periods of the electromagnetic signal transmitted at a respective frequency over a dwell time.

20. A method according to claim 17, wherein selecting a rate comprises selecting a rate $\omega_{FS}$ to effectuate a path length modulation at a frequency:

$$\omega_{FS} = \frac{2\pi}{\lambda} n_F S_F$$

where $\lambda$ represents the wavelength of the electromagnetic signal at a respective frequency, $n_F$ represents the index of refraction of a propagating medium of the propagation paths, and $S_F$ represents the selected rate.

* * * * *